United States Patent [19]

Heim et al.

[11] Patent Number: 5,115,031
[45] Date of Patent: May 19, 1992

[54] PROCESS FOR THE MANUFACTURE OF AN IMPACT RESISTANT THERMOPLASTIC RESIN

[75] Inventors: Philippe Heim; Gerard Riess, both of Mulhouse, France

[73] Assignee: Norsolor, France

[21] Appl. No.: 505,483

[22] Filed: Apr. 6, 1990

Related U.S. Application Data

[62] Division of Ser. No. 234,055, Aug. 19, 1988, Pat. No. 4,952,635.

[30] Foreign Application Priority Data

Aug. 20, 1987 [FR] France ............... 87 11759

[51] Int. Cl.$^5$ .............. C08F 2/30; C08F 265/04; C08F 279/02
[52] U.S. Cl. ................... 525/243; 525/252; 525/267
[58] Field of Search .......... 525/243, 252, 267

[56] References Cited

U.S. PATENT DOCUMENTS

| 3,370,105 | 2/1968 | De Bell et al. | 525/243 |
| 3,944,630 | 3/1976 | Ide et al. | 525/252 |
| 4,151,226 | 4/1979 | Movinaga et al. | 525/252 |
| 4,187,202 | 2/1980 | Kondo et al. | 525/252 |

Primary Examiner—John C. Bleutge
Assistant Examiner—Vasu S. Jagannathan
Attorney, Agent, or Firm—Finnegan, Henderson, Farabow, Garrett & Dunner

[57] ABSTRACT

A process for preparing a rubber modified thermoplastic resin, in which a latex in aqueous emulsion is prepared in the presence of a non-ionic surfactant; a vinyl monomer insoluble or substantially insoluble water is added, and the particles of the latex are transferred to the monomer to form an organic phase using a polymer or copolymer based on carboxylic acid units capable of forming an interpolymeric complex with the non-ionic surfactant; and a suspension or bulk polymerization of the organic phase is performed.

15 Claims, 1 Drawing Sheet

PROCESS FOR THE MANUFACTURE OF AN IMPACT RESISTANT THERMOPLASTIC RESIN

This is a divisional of application Ser. No. 07/234,055, filed Aug. 19, 1988, now U.S. Pat. No. 4,952,635.

BACKGROUND OF THE INVENTION

The present invention relates to an improved process for the manufacture of a rubber-modified thermoplastic resin. The invention also encompasses a resin made by this process.

Impact-resistant thermoplastic resins are conventionally obtained by hot mixing a powder resulting from the steps of coagulation, dewatering and drying of an elastomeric latex with the particles of a thermoplastic resin or "hard" polymer, resulting in what is called an "alloy." This process is unsatisfactory regarding both economy and the quality of the alloy.

To overcome these disadvantages, processes have already been proposed in which the abovementioned dewatering and drying steps are eliminated. In these processes, an emulsion of the elastomeric latex is followed directly by the polymerization of the thermoplastic resin. Polymerization results from the addition of electrolytes, acids and unsaturated monomer to the elastomeric latex which, after polymerization, should produce the thermoplastic matrix. These electrolytes or acids are destabilizing agents which neutralize the stabilizing effect of an ionic surfactant present on the elastomeric latex, causing the latter to flocculate. When monomer is added after the destabilizing agent, more or less rapid swelling by the monomer takes place. It is thus possible to end with a suspension polymerization. When the monomer is added before the destabilizing agent, the latter will cause an instantaneous transfer of the latex particles into the monomer, resulting in an organic phase containing a rubbery dispersion, which can then be polymerized in suspension or in bulk. Such techniques are described in Japanese Patent Nos. 82-36,102, 78-44,959, 81-50,907, 74-02,347, 74-11,748, 74-11,749, 79-18,893, 75-31,598, U.S. Pat. Nos. 4,141,932, 3,450,796, and 3,950,455, and German Patent No. 2,524,471.

These processes, however, require the use of large quantities of coagulating agents. In fact, the examples of Japanese Patent No. 75-31,598 show that a proportion of approximately 3% by weight of magnesium sulfate, relative to the final resin, is generally needed to destabilize the latex. Moreover, suspension polymerization is difficult in the case of a quantity greater than 35% by weight, relative to the final resin, of elastomeric particles, comprising a surface graft of "hard" polymer (hereinafter "grafted particles"), owing to the viscosity of the solution of the monomer in which these particles are dispersed and swollen.

As a result, research has been carried out to propose a process for the production of rubber-modified, impact-resistant thermoplastic resins, substantially free from the disadvantages referred to above.

The present invention relates to a process for the manufacture of an impact-resistant thermoplastic resin, this process including the step of transfer of the particles of a reinforcing latex into the monomers of the matrix by forming interpolymeric complexes that destabilize the latex. It also relates to the modified thermoplastic resins which are obtained by this process.

SUMMARY OF THE INVENTION

The present invention comprises the steps of:

(a) preparing an aqueous emulsion in the presence of a non-ionic surfactant from at least one ethylenically unsaturated monomer ("the base monomer," which may be chosen, for example, from dienes, substituted dienes, alkyl acrylates and aralkyl acrylates and olefins);

(b) adding at least one water-insoluble or substantially water-insoluble vinyl monomer (which may be chosen, for example, from alkyl methacrylates with alkyl groups from 1 to 4 carbon atoms, styrene, substituted styrenes, acrylonitrile, methacrylonitrile and vinyl halides) to the latex from step (a), along with at least one polymer or copolymer based on carboxylic acid units capable of forming an interpolymeric complex with the non-ionic surfactant employed in step (a), and lowering the pH of the mixture sufficiently to produce the transfer of the particles of the said latex into the vinyl monomer(s); and, (c) polymerizing (for example by bulk or suspension polymerization) the elastomeric latex and the vinyl monomer from step (b).

DESCRIPTION OF THE PREFERRED EMBODIMENT

Figure 1:
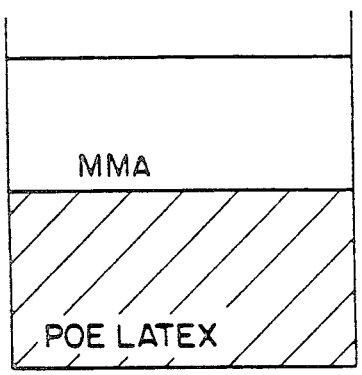
FIG. 1 shows the system of matrix monomer and latex prior to the addition of the polymer or copolymer based on carboxylic acid units in step (b) of the present invention.

In step (a), an aqueous emulsion of an elastomeric latex is prepared from the base monomer, in the presence of a non-ionic surfactant. The quantity of base monomer is preferably chosen so that the thermoplastic resin produced may contain from 1 to 90% by weight of elastomeric component. The latex prepared in step (a) is a modifying agent intended to reinforce the rigid thermoplastic matrix. Furthermore, it can advantageously be chosen so as to impart transparency to the final resin.

Butadiene, isoprene, chloroprene and 2,3-dimethylbutadiene are dienes which, among other dienes, can be employed as the base monomer in the invention. Among the alkyl acrylates which can alternatively be employed as the base monomer of step (a) are those containing one to fifteen carbons, preferably one to eight carbons, and most preferably two to eight carbons in the alkyl group. These include (for example) n-butyl acrylate, ethyl acrylate, 2-ethylhexyl acrylate and isobutyl acrylate. It is also possible to use alkyl acrylates having longer alkyl carbon chains. Aralkyl acrylates also useful in connection with step (a) the invention are those in which the cyclic moiety contains 5, 6, or 7 carbon atoms, with or without an additional alkyl bridge, with the alkyl moiety containing up to 15 carbon atoms. Other useful acrylates include substituted acrylates, such as alkylthioalkyl acrylates (e.g., alkylthioethyl acrylate), alkoxyalkyl acrylates (e.g., alkylthioethyl acrylate) and alkoxyalkyl acrylates (e.g., methoxyethyl acrylate). Among the olefins which may be employed in step (a) are ethylene, isobutylene and α-olefins containing from 3 to 12 carbon atoms.

Copolymerizable monomers which are useful in step (a) of the process are lower alkyl acrylates and methacrylates, lower alkoxy acrylates, cyanoethyl acrylate, acrylamide, lower hydroxyalkyl acrylates, lower hydroxylakyl methacrylates, acrylic acid, methanacrylic acid, acrylonitrile, styrene, substitutes styrenes and alkyl methacrylates. Styrene, acrylonitrile and methyl methacrylate are especially useful.

As is known in the art, when the latex is prepared sustantially from dienes or acrylates, it is obtained directly by an emulsion polymerization of these monomers. Alternatively, when the latex consists substantially of olefins, e.g., polyisobutylene, or ethylene-propylene or ethylene-propylene-diene rubber, these polymers are first prepared by cationic polymerization or by Ziegler-Natta catalysis. They are then dissolved in a solvent, which is subsequently evaporated off after the addition of water and a surfactant.

The polymerization of step (a) is carried out in the presence of a non-ionic surfactant, which may contain, among other groups, alkylene oxide groups or oxazoline groups. The polyoxyalkylenated surfactants which are useful in step (a) include, but are not limited to, alkylphenylpolyoxyethylenated surfactant, styrene-/ethylene oxide copolymers, propylene oxide/ethylene oxide copolymers and polyoxyethylenated alkyl esters.

Furthermore, still in step (a), one or more crosslinking monomers can be added to the base monomer, in a quantity up to 20 parts by weight per 100 parts by weight of the base monomer. The crosslinking monomers are chosen from monomers generally employed for this purpose, and particularly from the group consisting of polyol polymethacrylates and polyacrylates (e.g., alkylene glycol); dimethacrylates (e.g., ethylene glycol dimethacrylate, 1,3-butylene glycol dimethacrylate and propylene glycol dimethacrylate); alkelene glycol diacrylates (e.g., ethylene glycol diacrylate, 1,3- or 1,4-butylene glycol diacrylate and trimethylopropane trimethacrylate); polyvinylbenzenes (e.g., divinylbenze, trivinylbenzene, or ethylvinylbenzene); vinyl acrylate; and methacrylate.

It is also possible in step (a) to add to the base monomer at least one graft monomer in a quantity from 0.5 to 10 parts by weight per 100 parts by weight of said monomer. The use of at least one graft monomer is especially preferred in the case where the base monomer is something other than butadiene or substituted butadienes. After the polymerization, the graft monomers leave residual unsaturations which will enable the polymer formed to be grafted in a subsequent step, whether in the optional step (a1) described later, or else in step (b).

The graft monomer is chosen from monomers which are generally employed for this purpose, and particularly from the group consisting of copolymerizable allyl, methallyl or crotyl esters of $\alpha,\beta$-unsaturated carboxylic or dicarboxylic acids (e.g., allyl, methallyl and crotyl esters of acrylic acid, of methacrylic acid, of maleic acid (mono- and diesters), of fumaric acid (mono- and diesters) and of itaconic acid (mono- and diesters)); allyl ether, methallyl ether and crotyl vinyl ether; allyl thioether, methallyl thioether and crotyl vinyl thioether; N-allyl-, methallyl- and crotylmaleimide; vinyl esters of 3-butenoic acid and of 4-pentenoic acid; triallyl cyanurate; O-allyl, methallyl or crotyl-O-alkyl, aryl, alkaryl or aralkyl-P-vinyl; allyl or methallyl phosphonate; triallyl, trimethallyl or tricrot, 1 phosphate; O-vinyl, O,O-diallyl, dimethallyl or dicrotyl phosphate; cycloalkenyl esters of acrylic acid, methacrylic acid, maleic acid (mono- and diesters), fumaric acid (mono- and diesters), itaconic acid (mono- and diesters) e.g., as 2-, 3- or 4-cyclohexenyl acrylate); bicyclo[2,2,1]-5-hepten-2-yl esters of acrylic acid, methacrylic acid, maleic acid (mono- and diesters), fumaric acid (mono- and diesters) and itaconic acid (mono- and diesters); vinyl ethers and vinyl thioethers of cycloalkenols and of cycloalkenethiols (e.g., as vinyl-4-cyclohexen-1-yl ether and vinyl bicyclo[2,2,1]-5-hepten-2-ol ether); vinyl esters of cycloalkenecarboxylic acids (e.g., vinyl-3-cyclohexene-1-carboxylic acid and vinyl bicyclo[2,2,1]-5-heptene-2-carboxylate).

Among the graft monomers which may be employed, preference is given to compounds containing at least one allyl group; in particular, the allyl esters of ethylenically unsaturated acids. The most preferred are allyl acrylate, allyl methacrylate, diallyl maleate, diallyl fumarate, diallyl itaconate, allyl hydrogen maleate, allyl hydrogen fumarate and allyl hydrogen itaconate. The allyl diesters of polycarboxylic acids which do not contain any polymerizable unsaturation are also employed to advantage as graft monomers in step (a).

Step (a) is generally, but not necessarily, followed by an additional step (a1), in which at least one monoethylenically unsaturated monomer belonging to the group of the monomers introduced in step (b) undergoes an emulsion polymerization with the latex produced in step (a). Examples of such step (b) monomers are provided below in the description of step (b). The objective of this step (a1) is to "graft" a polymer compatible with the thermoplastic resin onto the surface of the elastomeric particles of the latex from step (a). These monomers will hereinafter be referred to as "compatibilization monomers." In addition, the expressions "grafted particles" and "grafted latex" are used below to indicate that step (a1) has occurred.

When step (a1) is employed, it is desirable that at least one graft monomer is employed in step (a), leaving, after polymerization, residual unsaturations to promote grafting of a step (b) monomer during this step (a1).

In step (a1), there are preferably employed from 99 to 15 parts by weight of the solid part of the latex from step (a), and from 1 to 85 parts by weight of the compatibilization monomers, per 100 parts by weight of the mixture of latex and compatibilization monomer. Additionally, at least one crosslinking monomer may be added in step (a1) to the compatibilization monomers employed, in a quantity ranging up to 5 parts by weight per 100 parts by weight of the compatibilization monomers. The crosslinking monomers useful in this step are the same as those indicated above in step (a). At least one grafting monomer, such as defined in step (a), can also be added during step (a1).

The emulsion polymerizations in these steps (a) and (a1), which are performed in the presence of a free radical initiator (e.g., a persulfate), do not require unusual reaction conditions and any of the ingredients known to the person skilled in the art may be employed.

Step (b) involves the transfer of the latex particles obtained during the preceding step or steps into the monomer (hereinafter, "the matrix monomer") intended to form the matrix. The principle of this transfer is shown diagrammatically in FIGS. 1 and 2.

The matrix monomer, and a solution of polymer or copolymer based on carboxylic acid units, are added to the elastomeric polymer latex from step (a) or (a1). The two, phases are illustrated in FIG. 1. The mixture is then stirred sufficiently to transfer the latex particles completely and instantly into the matrix monomer. This occurs by the addition of an acid, such as hydrochloric acid, lowering the pH of the mixture sufficiently to permit the formation of interpolymeric complexes via hydrogen bonding, thus destablizing the latex.

The matrix monomers employed in step (b) are insoluble or substantially insoluble in water. These include alkyl methacrylates (e.g., methyl methacrylate, which is preferred, isopropyl methacrylate, secondary butyl methacrylate, tert-butyl methacrylate), styrene, and substituted styrenes (e.g., α-methylstyrene, monochlorostyrene and tert-butyl styrene).

Monoethylenically unsaturated comonomers may also be introduced in this step. This includes those indicated above for the preparation of the latex of step (a).

Vinyl halides, particularly vinyl chloride, may also be used in this step (b). The monoethylenically unsaturated comonomers which may then be employed are vinyl esters (e.g., vinyl acetate, vinyl propionate, vinyl butyrate, vinyl chloroacetate, vinyl chloropropionate, vinyl benzoate, vinyl chlorobenzoate and others), as well as acrylic and α-acrylic acids (e.g., acrylic acid, methacrylic acid, methyl acrylate, ethyl acrylate, butyl acrylate, methyl methacrylate, acrylamide, N-methylacrylamide and methacrylamide).

At least 10 parts by weight of the matrix monomer per 100 parts by weight of the solid part of the latex obtained at the end of step (a) or (a1) are generally employed in this step (b).

The polymers or copolymers based on carboxylic acid units which may be employed in step (b) include polymethacrylic acid, polyacrylic acid, and copolymers having a high methacrylic acid content and a low methyl methacrylate content. When the non-ionic surfactant employed in step (a) is polymeric in nature, the quantity of polycarboxylic acid to be added must be greater than a critical value corresponding to the complexing of the units of the said polymer which are present on the latex with the carboxylic acid units. The stoichiometry of the complex formed is 1:1.

The transfer in step (b) is generally performed at a temperature ranging from 0° C. to approximately 100° C. However, the temperature is not a crucial factor in this step.

Figure 2:
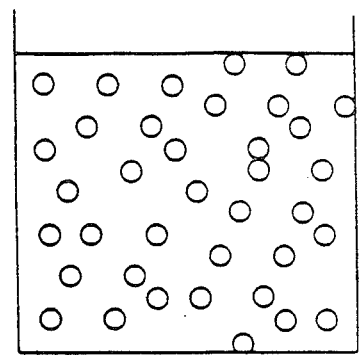
FIG. 2 shows the system of FIG. 1 after the addition of polymethacrylic acid in step (b) of the present invention.
Figure 3:
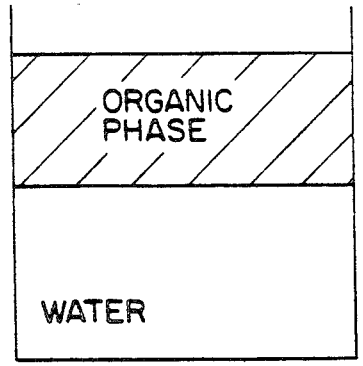
FIG. 3 shows the system of FIG. 1 after the addition of polyacrylic acid in step (b) of the present invention.

Step (b) produces an organic phase of matrix monomer containing the particles of optionally grafted elastomeric polymer from step (a), in a swollen state and homogeneously well dispersed. The aqueous phase is practically clear at the completion of step (b). This is illustrated in FIG. 2. Depending on whether polyacrylic acid or polymethacrylic acid is used in step (b), the organic phase of monomer containing the particles of optionally grafted elastomeric polymer may vary in appearance. This is illustrated in FIGS. 1–3. The expression "POE LATEX" in FIG. 1 denotes the latex obtained from step (a) using, in this example, a polyoxyethylenated surfactant, and "MMA" denotes the methyl methacrylate monomer used in this example as the matrix monomer.

Case 1: Formation of Interpolymeric Complexes with the Aid of Pplymethacrylic Acid When polymethacrylic acid (PMAA) is employed to destabilize the latex of optionally grafted elastomeric polymer, the organic phase containing the transferred particles separates from the aqueous phase in the form of a layer. This illustrated in FIG. 2. Its viscosity will depend on the swelling index of the elastomeric polymer particles in the matrix monomer employed, and on their concentration. It may thus be somewhat fluid, in which case step (c) will involve suspension polymerization, or somewhat pasty, in which case step (c) will preferably involve a bulk polymerization after separation and removal of the aqueous phase.

Case 2: Formation of Interpolymeric Complexes with the Aid of Polyacrylic Acid

When polyacrylic acid (PAA) is employed to destabilize the latex of optionally grafted elastomeric polymer, the organic phase containing the transferred particles is self-dispersing. This is illustrated in FIG. 3. This self-dispersion occurs regardless of the concentration of the said particles, with pearls varying from 20 μm to 200 μm, depending on the viscosity, temperature, and the intensity and type of stirring of the mixture. The stabilization of the pearls is ensured by the emulsifying action of the poly(ethylene oxide)-polyacrylic acid complexes. This self-dispersion of the organic phase containing the elastomeric polymer particles is highly advantageous, since it is then possible to perform a suspension polymerization directly in step (c).

After the transfer step (b) has taken place, it is still possible to adjust the weight relationship of the final thermoplastic resin to the optionally grafted elastomer by diluting the organic phase with the matrix monomer.

Step (c) of the process according to the invention is the polymerization, preferably by suspension or bulk polymerization, of the matrix monomer, including the dispersed elastomeric particles. Polymerizations of this type are carried out under known stirring, temperature and reaction time conditions.

In the case of a suspension polymerization, the dispersion obtained at the end of step (b) is heated, preferably to between 60° and 100° C., for a sufficient time to obtain complete polymerization of the matrix monomer, at a stirring rate of the order of 300–400 rpm, under a nitrogen atmosphere. The polymerization time depends on the proportion of rubbery component which is present, and is generally of the order of 3 to 5 hours. The disperse phase/aqueous phase ratio is generally between 0.1 and 1.5. Furthermore, dispersing agents (as indicated below) and inorganic salts may be added during the polymerization in order to obtain an ideal pearl size (which is approximately 200–300 μm). When the reaction is complete, the reactor is emptied and then, after decanting, washing and drying, the reinforced thermoplastic resin is recovered in pearl form.

The dispersing agents which may be employed during the suspension polymerization in step (c) are, preferably, but not limited to, hydroxyethyl cellulose, methyl cellulose, polyvinyl alcohol, gelatins, water-soluble alginates, copolymers of (meth)acrylic acid(s) and methyl methacrylate, and copolymers containing hydrophobic and hydrophilic units in general. The preferred dispersing agent is polyvinyl alcohol. Dispersing agents are generally employed in aqueous solution, in a proportion of 0.05 to 3% by weight relative to the final resin.

In the case of bulk polymerization, the aqueous phase must first be separated from the organic phase by decanting and centrifuging at the end of step (b). Bulk polymerization is generally carried out at a temperature ranging from 50° to 200° C.

To further illustrate the subject matter of the invention, descriptions of several examples of the use of the invention are provided below. These are not intended to imply any limitation.

EXAMPLE 1

This example relates to the preparation of an alloy of impact poly(methyl methacrylate), containing 30.4 by weight of a grafted elastomeric polymer.

Step (a): Preparation of a Latex of Butyl Acrylate/Styrene Copolymer by Emulsion Copolymerization The materials employed in this polymerization were:

| Material | Quantities introduced (parts by weight) |
|---|---|
| Butyl acrylate | 80.7 |
| Styrene | 19.3 |
| Octylphenylhydroxypolyoxyethylene. containing 30 ethylene oxide units. marketed under the trade name "Triton X305" | 2.2 (solid part) |
| Ethylene glycol dimethacrylate (crosslinking monomer) | 3.3 |
| Potassium persulfate | 0.41 |
| Deionized water | 339 |

Water and octylphenylhydroxypolyoxyethylene were mixed in a glass reaction vessel fitted with a stirrer, and the mixture was heated to 70° C. Butyl acrylate, styrene and the crosslinking monomer were added, followed by potassium persulfate in aqueous solution. The resulting mixture was stirred at a rate of the order of 250 rpm, while the temperature was maintained at 70° C. The polymerization time was 4 hours. The resulting latex had a solid content of 22.8% by weight, and a mean particle diameter of 330 nm.

Step (a1): Grafting of Poly(Methyl Methacrylate) onto the Latex from Step (a)

The materials employed in this graft polymerization were:

| Materials | Quantites introduced (parts by weight) |
|---|---|
| Latex from step (a) | 114 (solid part) |
| Methyl methacrylate | 17.7 |
| Potassium persulfate | 0.15 |
| Deionized water present | 446 |
| Ethylene glycol dimethacrylate | 0.05 |

This polymerization was carried out in a glass reaction vessel fitted with a stirrer, under a nitrogen atmosphere, at 70° C., for 2 hours.

The resulting grafted acrylic latex had a solid content of 22.6% and a mean particle diameter of 340 nm. Ethylene oxide unit concentration was $8.27 \times 10^{-5}$ mole of ethylene oxide unit concentration was $8.27 \times 10^{-5}$ mole of ethylene oxide units per gram of aqueous latex.

Step (b): Transfer of the Particles of the Grafted Acrylic Latex from Step (a1) into Methyl Methacrylate A mixture of 100 parts by weight of methyl methacrylate, 0.3 part by weight of lauryl mercaptan, 0.7 part by weight of lauroyl peroxide and 1.04 part by weight of polyacrylic acid (with a weight average molecular mass of 25,000) in 82 parts by weight of water was added to 195 parts by weight of the latex from step (a1). The resulting mixture was stirred. Fifteen parts by weight of a 0.5N solution of hydrochloric acid were then added, causing the appearance of a dispersion of particles of the grafted acrylic latex having a mean diameter of the order of 100 μm, in the methyl methacrylate. The pH of the mixture was 1.5.

Step (c): Polymerization of the Dispersion Obtained in Step (b)

A suspension polymerization of the dispersion obtained in step (b) was carried out for 3 hours at 60° C. and then for 1 hour at 80° C., in the presence of conventional suspension and salinity agents. The pearls were recovered and the treated in the usual manner.

EXAMPLE 2

This example relates to the preparation of an alloy of the impact styrene/acrylonitrile type, containing 53.6% by weight of grafted acrylic elastomeric polymer.

Step (a): Preparation of a Latex of Butyl Acrylate/Styrene Copolymer by Emulsion Copolymerization The materials employed in this polymerization were:

| Material | Quantities introduced (parts by weight) |
|---|---|
| Butyl acrylate | 80.7 |
| Styrene | 19.3 |
| Octylphenylhydroxypolyoxyethylene. containing 30 ethylene oxide units. marketed under the trade name "Triton X305" | 2.2 (solid part) |
| Ethylene glycol dimethacrylate (crosslinking monomer) | 3.3 |
| Potassium persulfate | 0.41 |
| Deionized water | 336 |

The procedure was as in step (a) of Example 1, but at 64° C. for 5 hours. The resulting latex had a solid content of 21.3% by weight and a mean particle diameter of 286 nm.

Step (a1): Grafting of Poly(Methyl Methacrylate) onto the Latex from Step (a).

The materials employed in this polymerization were:

| Materials | Quantities introduced (parts by weight) |
|---|---|
| Latex from step (a) | 42.6 (solid part) |
| Octylphenylhydroxypolyoxyethylene, containing 40 ethylene oxide units, marketed under the trade name "Triton X405" | 0.376 (solid part) |
| Styrene | 9.28 |
| Acrylonitrile | 3.72 |
| Potassium persulfate | 0.15 |
| Deionized water present | 177 |
| Divinylbenzene | 0.1 |

This polymerization was carried out at 70° C., for 3 hours. The resulting grafted acrylic latex had a solid content of 23.6% and a mean particle diameter of 306 nm. The concentration of ethylene oxide units was $1.19 \times 10^{-4}$ mole of ethylene oxide units per gram of aqueous latex.

Step (b): Transfer of the Particles of the Grafted Acrylic Elastomer into a Styrene Acrylonitrile Mixture A mixture of 24.5 parts by weight of styrene, 9.7 parts by weight of acrylonitrile, 0.1 part by weight of lauryl mercaptan, 0.37 part by weight of lauroyl peroxide, 1.378 parts by weight of polyacrylic acid (with a weight average molecular mass of 25,000) and 65.6 parts by weight of water was added to 170 parts by weight of the latex from step (a1). This mixture was stirred, and 10 parts by weight of a 1N solution of hydrochloric acid were added to it. This caused the appearance of a dispersion of elastomeric particles in styrene-acrylonitrile, having a mean diameter of the order of 50–100 μm.

Step (c): Suspension Polymerization of the Dispersion Obtained in Step (b)

The dispersion from step (b) was heated to 62° C. over a period of 30 minutes, after 1.05 parts by weight of potassium chloride and 0.055 part by weight of polyvinyl alcohol marketed under trade name "Rhodoviol 135" were added to it. Polymerization was carried out for 5 hours at 62° C. The pearls were recovered and treated in the usual manner.

What is claimed is:

1. A process for the manufacture of an impact resistant thermoplastic resin modified with an elastomeric latex, comprising the steps of:
   (a) preparing the elastomeric latex in an aqueous emulsion from at least one ethylenically unsaturated monomer in the presence of a non-ionic surfactant; (a1) polymerizing a compatibilization monomer with the latex of step (a) by emulsion polymerization to form a product, said compatibilization monomer comprising at least one monoethylenically unsaturated monomer selected from the monomers employed in step (b);
   (b) adding at least one vinyl monomer to the elastomeric latex from step (a), said vinyl monomer being insoluble or substantially insoluble in water, and adding at least one polymer or copolymer based on carboxylic units and capable of forming an interpolymeric complex with the non-ionic surfactant employed in step (a), and lowering the pH of the mixture sufficiently to transfer the particles of the latex from step (a) into said vinyl monomer and to cause formation of the interpolymeric complex; and,
   (c) polymerizing the elastomeric latex and the vinyl monomer from step (b).

2. The process of claim 1, wherein the polymerization of step (c) is bulk polymerization.

3. The process of claim 1, wherein the polymerization of step (c) is suspension polymerization.

4. The process of claim 1, wherein said non-ionic surfactant includes at least one alkylene oxide unit.

5. The process of claim 4, wherein said non-ionic surfactant is selected form the group consisting of alkylphenylpolyoxyethyl enated surfactants, styrene/ethylene oxide copolymers, propylene oxide/ethylene oxide copolymers, and polyoxyethylenated alkyl esters.

6. The process of claim 1, wherein said non-ionic surfactant includes at least one oxazoline unit.

7. The process of claim 1, wherein the amount of compatibilization monomer employed in step (a1) is from 1 to 85 parts by weight, and the amount of solid in the latex from step (a) is from 99 parts to 15 parts, per 100 parts total weight of product of step (a1).

8. The process of claim 1, further comprising the addition to the monomer of step (a) during step (a) of 10 parts by weight of a graft monomer per 100 parts by weight of the monomer.

9. The process of claim 1, further comprising the addition to the monomer of step (a) during step (a1) of 10 parts by weight of a graft monomer per 100 parts by weight of the monomer.

10. The process of claim 1, further comprising the addition to the latex of step (a) during step (a) of up to 20 parts by weight of a crosslinking monomer per 100 parts by weight of the monomer.

11. The process of claim 10, further comprising the addition to the monomer of step (a) during step (a1) of up to 5 parts by weight of a crosslinking monomer per 100 parts by weight of compatibilization monomer.

12. The process of claim 1, wherein the vinyl monomer added in step (b) is added in an amount of at least 10 parts by weight per 100 parts by weight of the solid part of the product from step (a1).

13. The process of claim 1, wherein the polymer or copolymer based on carboxylic acid units is selected from the group consisting of polymethacrylic acid or polyacrylic acid.

14. The process of claim 1, wherein the non-ionic surfactant is polymeric, and the quantity of polymer or copolymer based on carboxylic acid units added in step (b) is greater than an amount corresponding to the complexing of units of the non-ionic surfactant with units of the polymer or copolymer based on carboxylic acid units.

15. The process of claim 1, wherein the transfer of step (b) is carried out at a temperature between 0° C. and 100° C.

* * * * *

UNITED STATES PATENT AND TRADEMARK OFFICE
CERTIFICATE OF CORRECTION

PATENT NO. : 5,115,031
DATED : May 19, 1992
INVENTOR(S) : PHILIPPE HEIM et al.

It is certified that error appears in the above-identified patent and that said Letters Patent is hereby corrected as shown below:

Claim 5, col. 10, lines 8-9, delete "alkylphenylpolyoxyethyl enated" and insert therefor --alkylphenylpolyoxyethylenated--.

IN THE ABSTRACT:

Line 4, after "insoluble" (second occurrence) insert --in--.

Signed and Sealed this

Fourteenth Day of September, 1993

Attest:

BRUCE LEHMAN

Attesting Officer     Commissioner of Patents and Trademarks